（12）United States Patent
Xu (10) Patent No.: US 11,140,547 B2
(45) Date of Patent: Oct. 5, 2021

(54) METHOD FOR SECURELY CONTROLLING SMART HOME, AND TERMINAL DEVICE (71) Applicant: HUAWEI TECHNOLOGIES CO., LTD., Guangdong (CN)

(72) Inventor: Jianfeng Xu, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 221 days.

(21) Appl. No.: 16/463,514

(22) PCT Filed: Mar. 30, 2017

(86) PCT No.: PCT/CN2017/078852
§ 371 (c)(1),
(2) Date: May 23, 2019

(87) PCT Pub. No.: WO2018/094938
PCT Pub. Date: May 31, 2018

(65) Prior Publication Data
US 2019/0380029 A1 Dec. 12, 2019

(30) Foreign Application Priority Data
Nov. 26, 2016 (CN) .......................... 201611057266.5

(51) Int. Cl.
H04L 29/06 (2006.01)
H04L 29/08 (2006.01)
(Continued)

(52) U.S. Cl.
CPC ....... *H04W 12/0431* (2021.01); *H04W 12/03* (2021.01); *H04W 12/55* (2021.01); *H04W 84/12* (2013.01)

(58) Field of Classification Search
CPC . H04W 12/0431; H04W 12/55; H04W 12/03; H04L 63/0428; H04L 63/061
(Continued)

(56) References Cited

U.S. PATENT DOCUMENTS

2014/0226817 A1    8/2014  Von Huben et al.
2015/0097689 A1*   4/2015  Logue .................... H04W 4/38
                                                        340/632

(Continued)

FOREIGN PATENT DOCUMENTS

CN    102263776 A    11/2011
CN    103929307 A     7/2014
(Continued)

OTHER PUBLICATIONS

Office Action issued in Chinese Application No. 201780004906.2 dated Dec. 17, 2019, 12 pages (With English Translation).

(Continued)

*Primary Examiner* — Haresh N Patel
(74) *Attorney, Agent, or Firm* — Fish & Richardson P.C.

(57) ABSTRACT

A method for securely controlling a smart home, and a terminal device are provided, to resolve a prior-art problem that an intelligent terminal device is counterfeited. The method includes: displaying, by an intelligent terminal device, at least one operation indication for a smart home device when the intelligent terminal device receives an operation instruction entered by a user to add the smart home device, where the operation indication is used to instruct the user to perform function control on the smart home device; and generating, by the intelligent terminal device when determining an operation indication selected by the user from the at least one operation indication, a first key based on the selected operation indication, where the first key is
(Continued)

used by the intelligent terminal device to encrypt information to be sent to the smart home device.

13 Claims, 6 Drawing Sheets

(51) Int. Cl.
*H04L 12/58* (2006.01)
*H04W 12/0431* (2021.01)
*H04W 12/03* (2021.01)
*H04W 12/55* (2021.01)
*H04W 84/12* (2009.01)

(58) Field of Classification Search
USPC .......................................................... 713/171
See application file for complete search history.

(56) References Cited

U.S. PATENT DOCUMENTS

| | | | |
|---|---|---|---|
| 2015/0256355 A1* | 9/2015 | Pera | H04L 12/2803 700/90 |
| 2015/0341169 A1 | 11/2015 | Leppanen et al. | |
| 2015/0373022 A1* | 12/2015 | Dubman | H04L 63/10 726/3 |
| 2015/0373538 A1 | 12/2015 | Huang et al. | |
| 2016/0065592 A1 | 3/2016 | Svigals | |
| 2016/0087959 A1* | 3/2016 | Park | H04L 63/068 713/171 |
| 2016/0119322 A1* | 4/2016 | Woodward | H04W 12/04 713/171 |
| 2016/0127331 A1* | 5/2016 | Liu | H04L 9/0822 713/171 |
| 2016/0127334 A1* | 5/2016 | Bangole | H04L 67/12 713/171 |
| 2016/0134418 A1* | 5/2016 | Liu | H04L 9/083 713/171 |
| 2016/0142387 A1* | 5/2016 | Lockhart | H04L 63/061 713/171 |
| 2016/0173495 A1* | 6/2016 | Joo | H04L 63/102 713/171 |
| 2016/0174146 A1 | 6/2016 | Wang et al. | |
| 2016/0197721 A1* | 7/2016 | Lester | H04L 63/0435 713/171 |
| 2016/0203300 A1* | 7/2016 | Hu | H04N 21/21805 713/171 |
| 2016/0204933 A1* | 7/2016 | Ronchi | H04W 12/033 713/171 |
| 2016/0255502 A1* | 9/2016 | Rajadurai | H04L 9/0825 713/171 |
| 2016/0378689 A1* | 12/2016 | O'Hare | H04L 63/061 713/171 |
| 2016/0381010 A1* | 12/2016 | Bhandari | H04L 63/0435 713/171 |
| 2017/0206273 A1* | 7/2017 | Tannenbaum | G06F 16/61 |
| 2018/0115788 A1* | 4/2018 | Burns | G06K 9/00771 |
| 2018/0192460 A1* | 7/2018 | Huh | H04W 76/14 |
| 2019/0075073 A1* | 3/2019 | Erickson | H04W 4/80 |

FOREIGN PATENT DOCUMENTS

| | | |
|---|---|---|
| CN | 104540184 A | 4/2015 |
| CN | 104618391 A | 5/2015 |
| CN | 104641590 A | 5/2015 |
| CN | 105120456 A | 12/2015 |
| CN | 105243312 A | 1/2016 |
| CN | 105703829 A | 6/2016 |
| CN | 105933904 A | 9/2016 |
| CN | 106059869 A | 10/2016 |
| EP | 3007480 A1 | 4/2016 |
| WO | 2011139962 A1 | 11/2011 |

OTHER PUBLICATIONS

PCT International Search Report and Written Opinion issued in International Application No. PCT/CN2017/078852 dated May 16, 2017, 17 pages (with English translation).
Office Action issued in Chinese Application No. 201780004906.2 dated Aug. 5, 2020, 15 pages (with English ranslation).
Extended European Search Report issued in European Application No. 17874242.5 dated Oct. 7, 2019, 12 pages.
Sarikaya et al., "Secure IoT Bootstrapping: A Survey; draft-sarikaya-t2trg-sbootstrapping-01", Network Working Group, Jul. 1, 2016, 16 pages.
EPO Communication pursuant to Article 94(3) EPC issued in European Application No. 17874242.5 dated Jan. 28, 2021, 6 pages.

\* cited by examiner

METHOD FOR SECURELY CONTROLLING SMART HOME, AND TERMINAL DEVICE

CROSS-REFERENCE TO RELATED APPLICATIONS

This application is a national stage of International Application No. PCT/CN2017/078852, filed on Mar. 30, 2017, which claims priority to Chinese Patent Application No. 201611057266.5, filed on Nov. 26, 2016. Both of the aforementioned applications are hereby incorporated by reference in their entireties.

TECHNICAL FIELD

This application relates to the field of communications technologies, and in particular, to a method for securely controlling a smart home, and a terminal device.

BACKGROUND

As a Wireless Fidelity (Wireless Fidelity, Wi-Fi) network is widely used, there are increasingly more intelligent devices that perform communication based on the Wi-Fi network. In the smart home field, a large quantity of smart home devices need to access a Wi-Fi network generated by a router. However, limited by a form, the smart home devices such as a smart table lamp and a smart socket usually have no display or keyboard. A service set identifier (Service Set Identifier, SSID) of the Wi-Fi network cannot be selected, and a password of the Wi-Fi network cannot be entered. In addition, when the smart home device is connected to the Wi-Fi network by using some methods for configuring a network by using an APP on a smartphone, a status of the connected router cannot be viewed on the device.

In the prior art, network configuration for a smart home device and a Wi-Fi network is implemented in the following two manners.

Manner 1: In a Soft-AP network configuration technology, a smart home device that is to access a network is in a Soft-AP mode, and publishes a name of the smart home device that is to access a network. A user selects, in an application program (Application, APP) interface of an intelligent device, the smart home device that is to access a network and that needs to be configured; enters, in the APP interface, a name and a password of Wi-Fi generated by a router; and taps a configuration button to complete configuration. When scanning the name of the smart home device, an APP of the intelligent device is disconnected from a current router, is connected to a Soft-AP of the smart home device that is to access a network, and then sends preset network configuration information to the smart home device. The network configuration information includes the name and the password of the Wi-Fi generated by the router. After obtaining, from the APP, the name and the password of the Wi-Fi generated by the router, the smart home device that is to access a network exits the Soft-AP mode, and is connected to the router. The APP returns to be connected to the router, and receives a notification that the smart home device that is to access a network is online.

Manner 2: In a broadcast network configuration technology, an intelligent device sends network configuration information to a smart home device by adding the network configuration information to a Wi-Fi multicast packet, a Wi-Fi broadcast packet, a Wi-Fi unicast packet, or any combination thereof. After receiving the network configuration information, the smart home device is automatically connected to a Wi-Fi network specified by the network configuration information. The intelligent device includes smart home devices such as a smartphone, a set top box (Set Top Box, STB), and a smart television box.

In conclusion, in the prior art, the user uses a non-contact and non-proximity network configuration manner. The following problems exist: Another smart home device is added to a Wi-Fi network of a router in a home of the user by mistake, or a smart home device of the user is configured on other Wi-Fi network of a router in a home of other user, or an intelligent terminal of another user counterfeits an intelligent terminal device in a home of the user, or configuration information is intercepted by a surrounding malicious wireless interception device, or the like. How to provide a secure and reliable solution of network configuration for a smart home device and a Wi-Fi network to avoid network configuration information leakage is a problem that needs to be resolved currently.

SUMMARY

Embodiments of this application provide a method for securely controlling a smart home device, and a terminal device, to resolve a prior-art problem that an intelligent terminal device is counterfeited.

According to a first aspect, this application provides a method for securely controlling a smart home device, and the method includes: displaying, by an intelligent terminal device, at least one operation indication for a smart home device when the intelligent terminal device receives an operation instruction entered by a user to add the smart home device, where the operation indication is used to instruct the user to perform function control on the smart home device, and the operation indication is determined based on a type of the smart home device; and generating, by the intelligent terminal device when determining an operation indication selected by the user from the at least one operation indication, a first key based on the selected operation indication, where the first key is used by the intelligent terminal device to encrypt information to be sent to the smart home device, and the information may be network configuration authentication information to be sent to the smart home device, or may be control command information sent to the smart home. The operation indication may be automatically generated by the intelligent terminal device, or may be a combination that is preset by the user and that is received by the intelligent terminal device.

In this embodiment of the present invention, the method for securely controlling a smart home device is provided. The intelligent terminal device selects the corresponding operation indication based on the type of the smart home device, and generates, based on the operation indication, the first key used to encrypt the information to be sent to the smart home device. The user manages and controls a network configuration password at a close distance. In this way, a secure and reliable solution of network configuration for the smart home device and a Wi-Fi network is provided, to avoid network configuration information leakage.

In a possible design, the intelligent terminal device receives the operation indication selected by the user from the at least one operation indication.

In a possible design, when determining the operation indication, the intelligent terminal device performs, by using a specified algorithm, an operation on the function control corresponding to the operation indication, to obtain the first key, and then the intelligent terminal device generates a second key based on the first key. The second key is used by the intelligent terminal device to encrypt the information to be sent to the smart home device.

In this embodiment of the present invention, the information sent by the intelligent terminal device to the smart home device is encrypted by using the second key, to further improve network configuration information security.

In a possible design, after the generating, by the intelligent terminal device when determining an operation indication selected by the user from the at least one operation indication, a first key based on the selected operation indication, the intelligent terminal device encrypts, by using the first key, authentication information for controlling the intelligent terminal device to access a Wi-Fi network, and sends encrypted authentication information of the Wi-Fi network to the smart home device. The authentication information includes at least one of a name, a password, or a certificate of the Wi-Fi network.

According to a second aspect, this application provides a method for securely controlling a smart home device, and the method includes: receiving, by a smart home device, a function control instruction triggered by a user, where the function control instruction is entered by the user based on at least one operation indication displayed on an intelligent terminal device, and the operation indication is used to instruct the user to perform function control on the smart home device; and generating, by the smart home device, a first key based on the function control instruction, where the first key is used to decrypt encrypted information sent by the intelligent terminal device to the smart home device.

In a possible design, after the smart home device generates the first key based on the function control instruction, the intelligent terminal device generates a second key based on the first key. The second key is used to decrypt the encrypted information sent by the intelligent terminal device to the smart home device.

In a possible design, after the generating, by the smart home device, a first key based on the function control instruction, the method further includes:

receiving, by the smart home device, encrypted authentication information that is of a Wi-Fi network and sent by the intelligent terminal device, and decrypting the encrypted authentication information of the Wi-Fi network by using the stored first key, to obtain decrypted authentication information of the Wi-Fi network, where the authentication information includes at least one of a name, a password, or a certificate of the Wi-Fi network; and accessing, by the smart home device, the corresponding Wi-Fi network by using the decrypted authentication information of the Wi-Fi network.

According to a third aspect, this application provides an intelligent terminal device, and the intelligent terminal device includes: a display module, configured to display at least one operation indication for a smart home device when the intelligent terminal device receives an operation instruction entered by a user to add the smart home device, where the operation indication is used to instruct the user to perform function control on the smart home device; and a processing module, configured to generate, when an operation indication selected by the user from the at least one operation indication is determined, a first key based on the selected operation indication, where the first key is used by the intelligent terminal device to encrypt information to be sent to the smart home device.

In a possible design, the processing module is further configured to receive any operation indication selected by the user from the at least one operation indication.

In a possible design, the processing module is further configured to generate a second key based on the first key. The second key is used by the intelligent terminal device to encrypt the information to be sent to the smart home device.

In a possible design, the intelligent terminal device further includes: a sending module, configured to: encrypt, by using the first key, authentication information for controlling the intelligent terminal device to access a Wi-Fi network, and send encrypted authentication information of the Wi-Fi network to the smart home device, where the authentication information includes at least one of a name, a password, or a certificate of the Wi-Fi network.

According to a fourth aspect, this application provides a smart home device, and the smart home device includes: a receiving module, configured to receive a function control instruction triggered by a user, where the function control instruction is entered by the user based on at least one operation indication displayed on an intelligent terminal device, and the operation indication is used to instruct the user to perform function control on the smart home device; and a generation module, configured to generate a first key based on the function control instruction, where the first key is used to decrypt encrypted information sent by the intelligent terminal device to the smart home device.

In a possible design, the processing module is further configured to generate a second key based on the first key. The second key is used to decrypt the encrypted information sent by the intelligent terminal device to the smart home device.

In a possible design, a processing module is configured to: receive encrypted authentication information that is of a Wi-Fi network and sent by the intelligent terminal device, and decrypt the encrypted authentication information of the Wi-Fi network by using the stored first key, to obtain decrypted authentication information of the Wi-Fi network, where the authentication information includes at least one of a name, a password, or a certificate of the Wi-Fi network. The processing module is further configured to access the corresponding Wi-Fi network by using the decrypted authentication information of the Wi-Fi network.

According to a fifth aspect, an embodiment of this application further provides an intelligent terminal device, including: a memory, configured to store a program instruction; and a processor, configured to invoke the program instruction stored in the memory to: control, when an operation instruction entered by a user to add a smart home device is received, a display to display at least one operation indication for the smart home device, where the operation indication is used to instruct the user to perform function control on the smart home device; and generate, when an operation indication selected by the user from the at least one operation indication is determined, a first key based on the selected operation indication, where the first key is used by the intelligent terminal device to encrypt information to be sent to the smart home device. The intelligent terminal device may be a mobile terminal, a computer, or the like.

In a possible design, the processor is further configured to receive the operation indication selected by the user from the at least one operation indication.

In a possible design, the processor is further configured to generate a second key based on the first key. The second key is used by the intelligent terminal device to encrypt the information to be sent to the smart home device.

In a possible design, the processor is further configured to: encrypt, by the intelligent terminal device by using the first key, authentication information for controlling the intelligent terminal device to access a Wi-Fi network, and send encrypted authentication information of the Wi-Fi network to the smart home device. The authentication information includes at least one of a name, a password, or a certificate of the Wi-Fi network.

According to a sixth aspect, this application provides a smart home device, and the smart home device includes: a memory, configured to store a program instruction; and a processor, configured to invoke the program instruction stored in the memory to: receive a function control instruction triggered by a user, where the function control instruction is entered by the user based on at least one operation indication displayed on an intelligent terminal device, and the operation indication is used to instruct the user to perform function control on the smart home device; and generate a first key based on the function control instruction, where the first key is used to decrypt encrypted information sent by the intelligent terminal device to the smart home device.

In a possible design, the processor is further configured to: generate a second key based on the first key, where the second key is used to decrypt the encrypted information sent by the intelligent terminal device to the smart home device.

In a possible design, the processor is further configured to: receive encrypted authentication information that is of a Wi-Fi network and sent by the intelligent terminal device, and decrypt the encrypted authentication information of the Wi-Fi network by using the stored first key, to obtain decrypted authentication information of the Wi-Fi network, where the authentication information includes at least one of a name, a password, or a certificate of the Wi-Fi network; and access, by the second processor, the corresponding Wi-Fi network by using the decrypted authentication information of the Wi-Fi network.

According to a seventh aspect, an embodiment of this application further provides a computer storage medium, and the storage medium stores a software program. When being read and executed by one or more processors, the software program may implement the method provided in any one of the first aspect or the designs of the first aspect.

DESCRIPTION OF EMBODIMENTS

To make the objectives, technical solutions, and advantages of this application clearer, the following further describes this application in detail with reference to the accompanying drawings.

Embodiments of this application provide a method for securely controlling a smart home device, and a terminal device, to resolve a prior-art problem that configuration information of a smart home device and a Wi-Fi network is intercepted by a surrounding malicious wireless interception device, a smart home device is counterfeited, or an intelligent terminal is counterfeited. The method and the apparatus are conceived based on a same invention. The method and the apparatus have similar principles for resolving the problems. Therefore, for implementation of the apparatus and the method, refer to each other, and details of repeated parts are not described.

In addition, in the description of this application, the words such as "first" and "second" are merely used for distinction description, and shall not be understood as an indication or implication of relative importance or an indication or implication of an order.

With reference to the accompanying drawings, the following describes in detail the method for securely controlling a smart home device according to this application.

Figure 1:
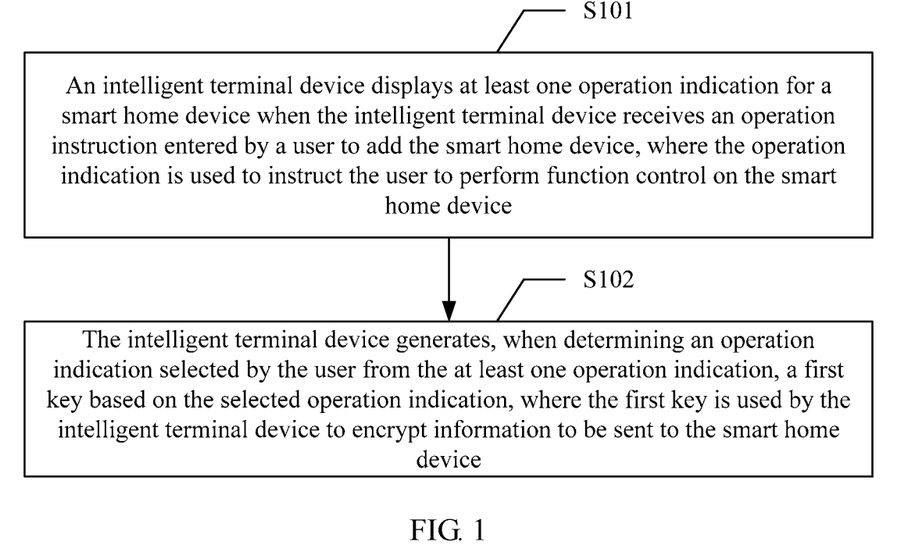
FIG. 1 is a flowchart of a method for securely controlling a smart home device according to an embodiment of this application.

Referring to FIG. 1, FIG. 1 is a flowchart of a method for securely controlling a smart home device according to this application. When a network needs to be configured for a smart home device, a user adds, in an APP interface on an intelligent device, the smart home device that is to access a network and that needs to be configured. The method includes the following steps.

S101. An intelligent terminal device displays at least one operation indication for a smart home device when the intelligent terminal device receives an operation instruction entered by a user to add the smart home device, where the operation indication is used to instruct the user to perform function control on the smart home device.

For example, the intelligent terminal device may be a smartphone, an STB, OTT, or the like, and the smart home device may be a smart table lamp, a smart air conditioner, a smart sound box, or the like. When the intelligent terminal device is a smartphone, the smart home device is a smart table lamp, and when the smartphone need to set the smart table lamp, an operation indication displayed by an application program (Application, APP) on the smartphone indicates a combination of function control that can be performed on the smart home, and the combination may be any function control that is repeatedly performed any quantity of times. For example, function control of the smart table lamp is: {turn on, turn off, lighten, dim}. In this case, the operation indication may be turning on the smart table lamp two consecutive times, three consecutive times, or four consecutive times, or dimming the smart table lamp after lightening the smart table lamp. When the smart home device is a smart air conditioner, the operation indication displayed by the APP may be sequentially pressing one or more keys of a remote control of the smart air conditioner, or pressing a composite key of the remote control. The APP on the smartphone randomly displays one or more operation indications. The operation indication is determined based on a type of the smart home device.

S102. The intelligent terminal device generates, when determining an operation indication selected by the user from the at least one operation indication, a first key based on the selected operation indication, where the first key is used by the intelligent terminal device to encrypt information to be sent to the smart home device.

Optionally, the first key is further used by the intelligent terminal device to authenticate the information to be sent to the smart home device.

Specifically, the selected operation indication is processed by using a specified algorithm, to generate the first key. The determined operation indication may be mapped to a combination of random numbers by using the specified algorithm. The random numbers may be further encrypted by using a fourth-square cipher, a substitution cipher, a transposition cipher, a rotor cipher, a polyalphabetic cipher, and a transposition cipher. This is not limited in the present invention.

In this embodiment of the present invention, the method for securely controlling a smart home device is provided. The intelligent terminal device selects the corresponding operation indication based on the type of the smart home device, and generates, based on the operation indication, the first key used to encrypt the information to be sent to the smart home device. The user manages and controls network configuration at a close distance. In this way, a secure and reliable solution of network configuration for the smart home device and a Wi-Fi network is provided, to avoid network configuration information leakage.

In a possible implementation, after step S101, the method further includes: receiving, by the intelligent terminal device, the operation indication selected by the user from the at least one operation indication.

In a possible implementation, after step S102, the method further includes: generating, by the intelligent terminal device, a second key based on the first key, where the second key is used by the intelligent terminal device to encrypt the information to be sent to the smart home device.

Specifically, the intelligent terminal device generates the second key by combining the first key and another encryption manner. The another encryption manner includes an AES encryption algorithm.

Optionally, the second key may be further used by the intelligent terminal device to authenticate the information to be sent to the smart home device.

In this embodiment of the present invention, the information sent by the intelligent terminal device to the smart home device is encrypted by using the second key, to further improve network configuration information security.

In a possible implementation, after step S102, the method further includes: encrypting, by the intelligent terminal device by using the first key, authentication information for controlling the intelligent terminal device to access a Wi-Fi network, and sending encrypted authentication information of the Wi-Fi network to the smart home device, where the authentication information includes at least one of a name, a password, or a certificate of the Wi-Fi network.

In a possible implementation, after the intelligent terminal device stores the second key, the method further includes: encrypting, by the intelligent terminal device by using the second key, the authentication information for controlling the intelligent terminal device to access the Wi-Fi network, and sending encrypted authentication information of the Wi-Fi network to the smart home device, where the authentication information includes at least one of the name, the password, or the certificate of the Wi-Fi network.

Figure 2:
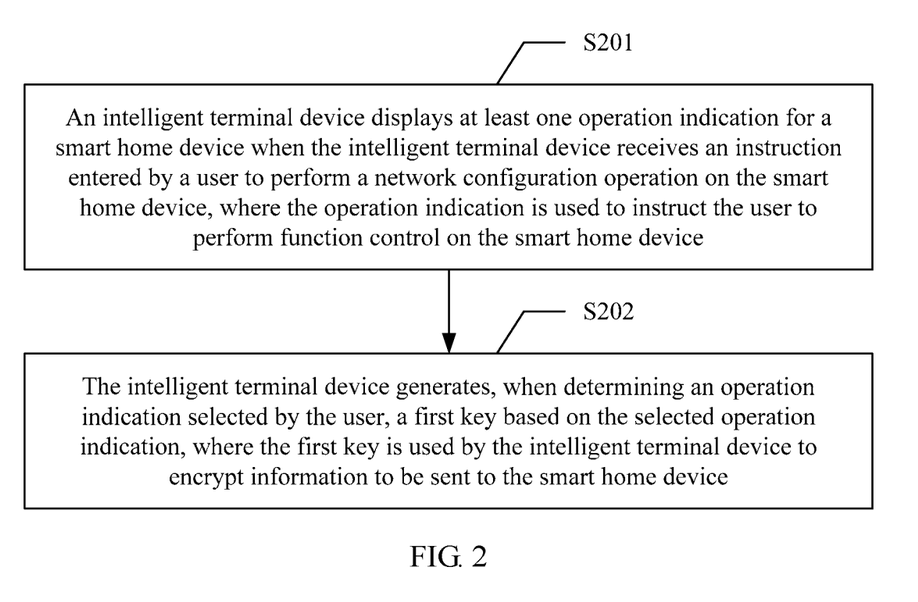
FIG. 2 is a flowchart of another method for securely controlling a smart home device according to an embodiment of this application.

Referring to FIG. 2, FIG. 2 is a flowchart of another method for securely controlling a smart home device according to this application. The method includes the following steps:

S201. An intelligent terminal device displays at least one operation indication for a smart home device when the intelligent terminal device receives an instruction entered by a user to perform a network configuration operation on the smart home device, where the operation indication is used to instruct the user to perform function control on the smart home device.

S202. The intelligent terminal device generates, when determining an operation indication selected by the user, a first key based on the selected operation indication, where the first key is used by the intelligent terminal device to encrypt information to be sent to the smart home device.

Figure 3:
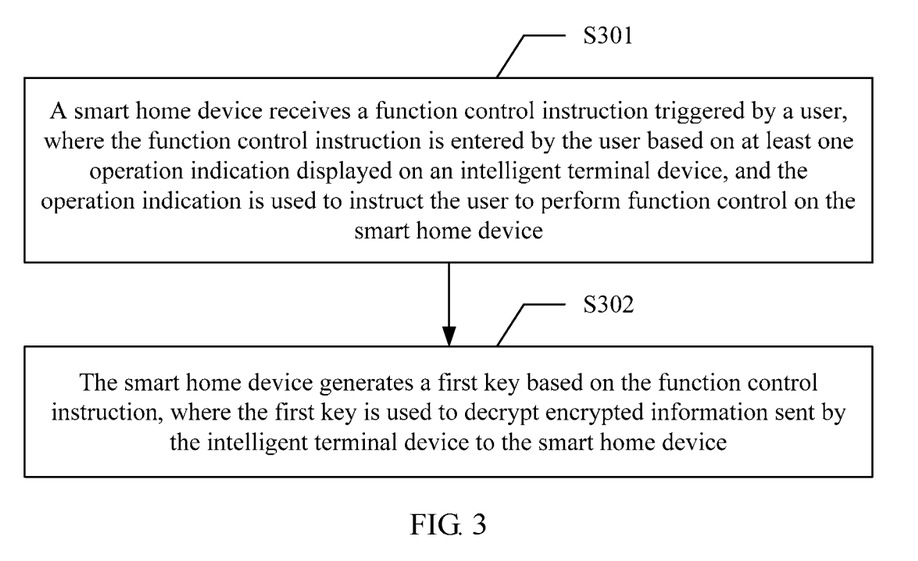
FIG. 3 is a flowchart of still another method for securely controlling a smart home device according to an embodiment of this application.

Referring to FIG. 3, FIG. 3 is a flowchart of still another method for securely controlling a smart home device according to this application. The method includes the following steps:

S301. A smart home device receives a function control instruction triggered by a user, where the function control instruction is entered by the user based on at least one operation indication displayed on an intelligent terminal device, and the operation indication is used to instruct the user to perform function control on the smart home device.

Optionally, the function control instruction received by the smart home device is triggered by the user through contact or is an extremely close distance operation.

S302. The smart home device generates a first key based on the function control instruction, where the first key is used to decrypt encrypted information sent by the intelligent terminal device to the smart home device.

Optionally, the first key is further used to authenticate the information sent by the intelligent terminal device to the smart home device.

In a possible implementation, after step S302, the method further includes: generating, by the intelligent terminal device, a second key based on the first key, where the second key is used to decrypt the encrypted information sent by the intelligent terminal device to the smart home device, or authenticate the information sent by the intelligent terminal device to the smart home device.

Specifically, the intelligent terminal device generates the second key by combining the first key and another decryption manner.

In a possible implementation, after step S302, the method further includes: receiving, by the smart home device, encrypted authentication information that is of a Wi-Fi network and sent by the intelligent terminal device, and decrypting the encrypted authentication information of the Wi-Fi network by using the stored first key, to obtain decrypted authentication information of the Wi-Fi network, where the authentication information includes at least one of a name, a password, or a certificate of the Wi-Fi network; and accessing, by the smart home device, the corresponding Wi-Fi network by using the decrypted authentication information of the Wi-Fi network.

In a possible implementation, after the smart home device stores the second key, the method further includes: receiving, by the smart home device, the encrypted authentication information that is of the Wi-Fi network and sent by the intelligent terminal device, and decrypting the encrypted authentication information of the Wi-Fi network by using the stored second key, to obtain decrypted authentication information of the Wi-Fi network, where the authentication information includes at least one of the name, the password, or the certificate of the Wi-Fi network; and accessing, by the smart home device, the corresponding Wi-Fi network by using the decrypted authentication information of the Wi-Fi network.

Figure 4A:
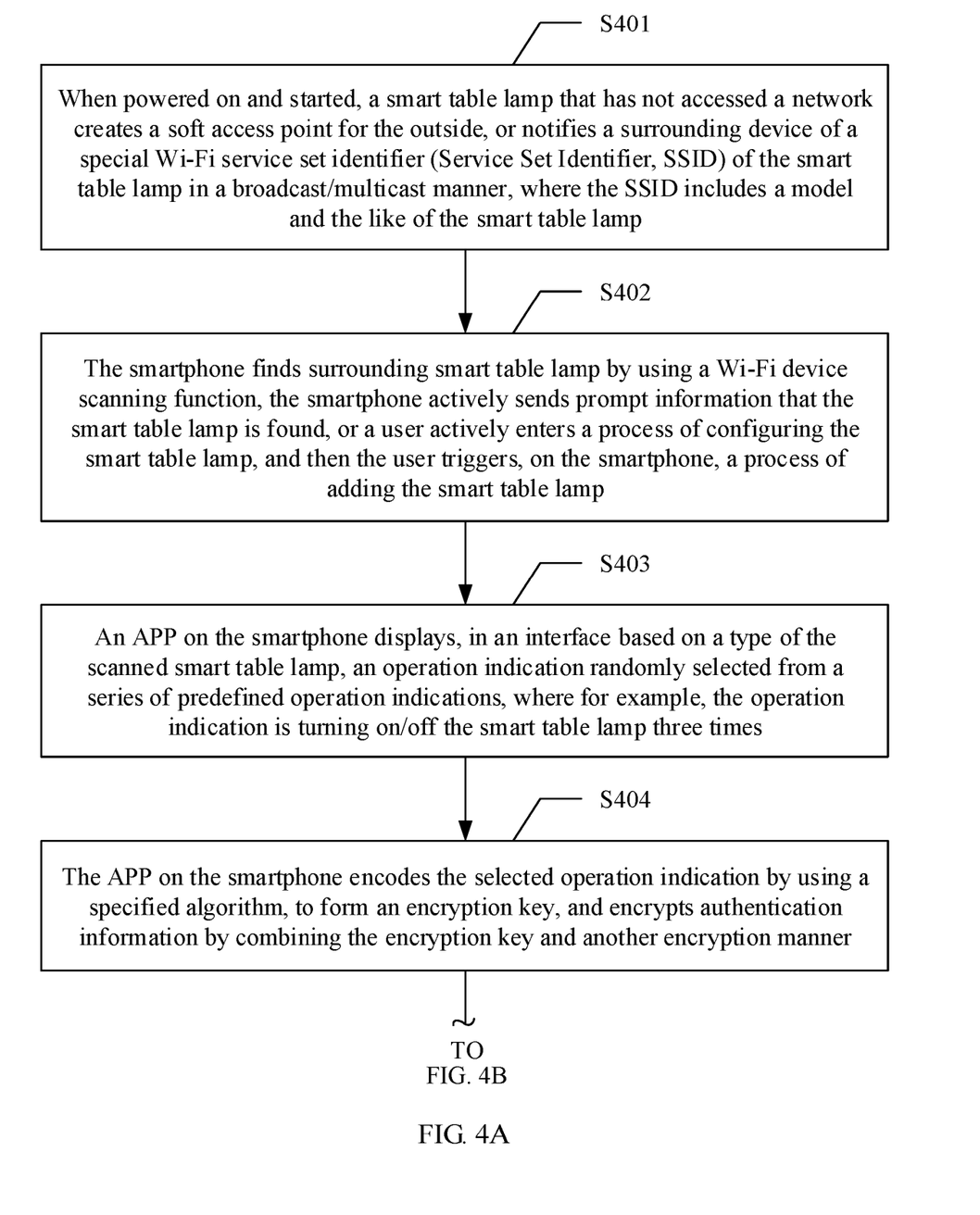
FIG. 4A and FIG. 4B are a flowchart of yet another method for securely controlling a smart home device according to an embodiment of this application.
Figure 4B:
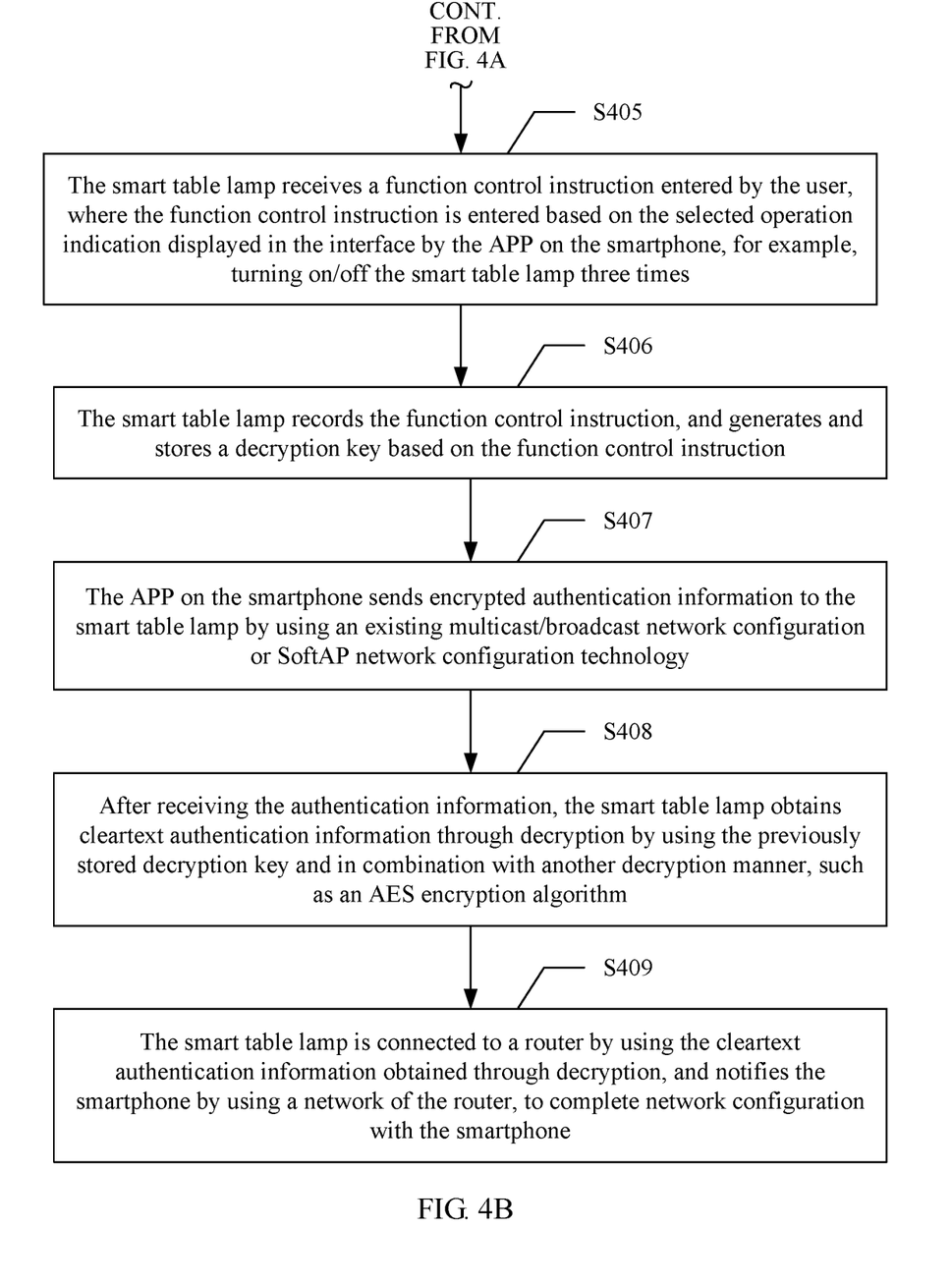

Referring to FIG. 4A and FIG. 4B, FIG. 4A and FIG. 4B are a flowchart of yet another method for securely controlling a smart home device according to an embodiment of this application. It is assumed that an intelligent terminal device is a smartphone, and a smart home device is a smart table lamp. The method includes the following steps:

S401. When powered on and started, the smart table lamp that has not accessed a network creates a soft enabled access point (Access Point, AP) for the outside, or notifies a surrounding device of a special Wi-Fi service set identifier (Service Set Identifier, SSID) of the smart table lamp in a broadcast/multicast manner, where the SSID includes a model and the like of the smart table lamp.

S402. The smartphone finds surrounding smart table lamp by using a Wi-Fi device scanning function, the smartphone actively sends prompt information that the smart table lamp is found, or a user actively enters a process of configuring the smart table lamp, and then the user triggers, on the smartphone, a process of adding the smart table lamp.

S403. An APP on the smartphone displays, in an interface based on a type of the scanned smart table lamp, an operation indication randomly selected from a series of predefined operation indications, where for example, the operation indication is turning on/off the smart table lamp three times.

S404. The APP on the smartphone encodes the selected operation indication by using a specified algorithm, to form an encryption key, and encrypts authentication information by combining the encryption key and another encryption manner.

S405. The smart table lamp receives a function control instruction entered by the user, where the function control instruction is entered based on the selected operation indication displayed in the interface by the APP on the smartphone, for example, turning on/off the smart table lamp three times.

S406. The smart table lamp records the function control instruction, and generates and stores a decryption key based on the function control instruction.

S407. The APP on the smartphone sends encrypted authentication information to the smart table lamp by using an existing multicast/broadcast network configuration or SoftAP network configuration technology.

S408. After receiving the authentication information, the smart table lamp obtains cleartext authentication information through decryption by using the previously stored decryption key and in combination with another decryption or authentication manner, such as an AES encryption algorithm.

S409. The smart table lamp is connected to a router by using the cleartext authentication information obtained through decryption, and notifies the smartphone by using a network of the router, to complete network configuration.

Figure 5:
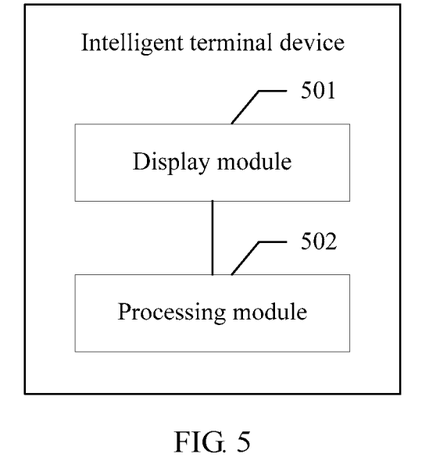
FIG. 5 is a schematic diagram of an intelligent terminal device according to an embodiment of this application.

Based on a same invention concept as the method embodiments, this application further provides a schematic diagram of an intelligent terminal device. As shown in FIG. 5, the intelligent terminal device includes:

a display module 501, configured to display at least one operation indication for a smart home device when the intelligent terminal device receives an operation instruction entered by a user to add the smart home device, where the operation indication is used to instruct the user to perform function control on the smart home device; and a processing module 502, configured to generate, when an operation indication selected by the user from the at least one operation indication is determined, a first key based on the selected operation indication, where the first key is used by the intelligent terminal device to encrypt information to be sent to the smart home device.

In this embodiment of the present invention, the intelligent terminal device is provided. The intelligent terminal device selects the corresponding operation indication based on a type of the smart home device, and generates, based on the operation indication, the first key used to encrypt the information to be sent to the smart home device. The user manages and controls network configuration at a close distance. In this way, a secure and reliable solution of network configuration for the smart home device and a Wi-Fi network is provided, to avoid network configuration information leakage.

In a possible implementation, the processing module 502 is further configured to receive the operation indication selected by the user from the at least one operation indication.

In a possible implementation, the processing module 502 is further configured to generate a second key based on the first key. The second key is used by the intelligent terminal device to encrypt the information to be sent to the smart home device.

In a possible implementation, the intelligent terminal device further includes: a sending module, configured to: encrypt, by using the encryption key, authentication information for controlling the intelligent terminal device to access a Wi-Fi network, and send encrypted authentication information of the Wi-Fi network to the smart home device, where the authentication information includes at least one of a name, a password, or a certificate of the Wi-Fi network.

In a possible implementation, the operation indication is determined based on a type of the smart home device.

Figure 6:
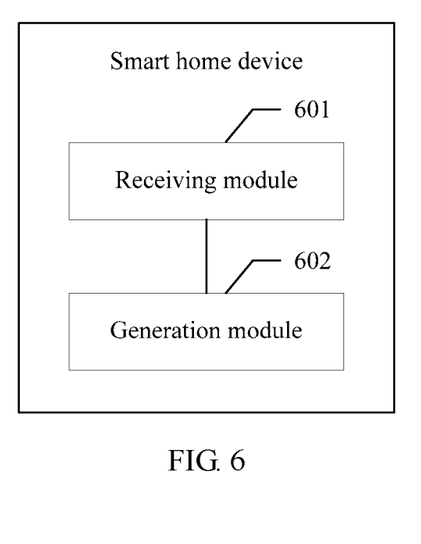
FIG. 6 is a schematic diagram of a smart home device according to an embodiment of this application.

Based on a same invention concept as the method embodiments, this application further provides a schematic diagram of a smart home device. As shown in FIG. 6, the smart home device includes:

a receiving module 601, configured to receive a function control instruction triggered by a user, where the function control instruction is entered by the user based on at least one operation indication displayed on an intelligent terminal device, and the operation indication is used to instruct the user to perform function control on the smart home device; and a generation module 602, configured to generate a first key based on the function control instruction, where the first key is used to decrypt encrypted information sent by the intelligent terminal device to the smart home device.

In a possible implementation, the processing module is further configured to generate a second key based on the first key. The second key is used to decrypt the encrypted information sent by the intelligent terminal device to the smart home device.

In a possible implementation, the smart home device further includes: a processing module, configured to: receive encrypted authentication information that is of a Wi-Fi network and sent by the intelligent terminal device, and decrypt the encrypted authentication information of the Wi-Fi network by using the stored decryption key, to obtain decrypted authentication information of the Wi-Fi network, where the authentication information includes at least one of a name, a password, or a certificate of the Wi-Fi network. The processing module is further configured to access the corresponding Wi-Fi network by using the decrypted authentication information of the Wi-Fi network.

Module division in the embodiments of this application is an example, is merely logical function division, and may be other division during actual implementation. In addition, functional modules in the embodiments of this application may be integrated in one processor, or may exist alone physically, or two or more modules are integrated into one module. The integrated module may be implemented in a form of hardware, or may be implemented in a form of a software functional module.

Figure 7:
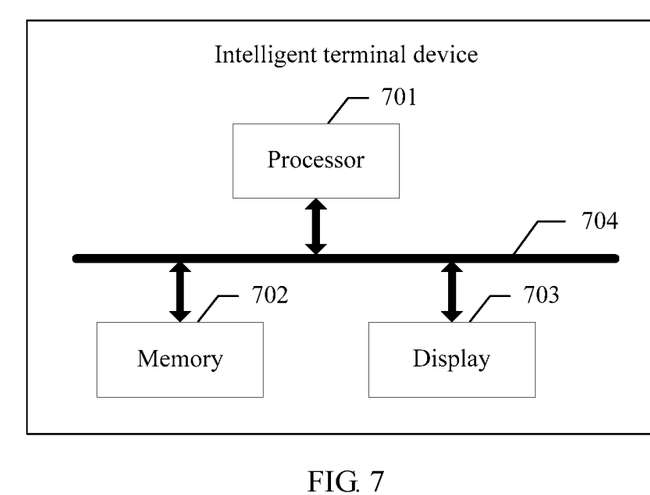
FIG. 7 is a structural diagram of hardware of an intelligent terminal device according to an embodiment of this application.

When the integrated module is implemented in the form of hardware, as shown in FIG. 7, an intelligent terminal device may include a processor 701. Hardware of an entity corresponding to the module may be the processor 701. The processor 701 may be a central processing unit (English: central processing unit, CPU for short), a digital processing module, or the like. The processor 701 receives an operation instruction sent by a user to add a smart home device. The apparatus further includes a memory 702, configured to store a program executed by the processor 701. The memory 702 may be a nonvolatile memory such as a hard disk or a solid state disk, or may be a volatile memory (English: volatile memory) such as a random access memory (English: random access memory, RAM for short). The memory 702 is any other medium that can be configured to carry or store desired program code in a form of an instruction or a data structure and that can be accessed by a computer, but is not limited thereto.

The processor 701 is configured to execute the program code stored in the memory 702, to specifically invoke a program instruction stored in the first memory to: control, when the operation instruction entered by the user to add the smart home device is received, a display 703 to display at least one operation indication for the smart home device, where the operation indication is used to instruct the user to perform function control on the smart home device; and generate, when an operation indication selected by the user from the at least one operation indication is determined, a first key based on the selected operation indication, where the first key is used by the intelligent terminal device to encrypt information to be sent to the smart home device.

A specific connection medium between the processor 701, the memory 702, and the display 703 is not limited in this embodiment of this application. In this embodiment of this application, the memory 702, the processor 701, and the display 703 are connected by using a bus 704 in FIG. 7. The bus is indicated by using a bold line in FIG. 7. A manner of connection between other components is merely an example for description, and imposes no limitation. The bus may be classified into an address bus, a data bus, a control bus, and the like. For ease of indication, the bus is indicated by using only one bold line in FIG. 7. However, it does not indicate that there is only one bus or only one type of bus.

Figure 8:
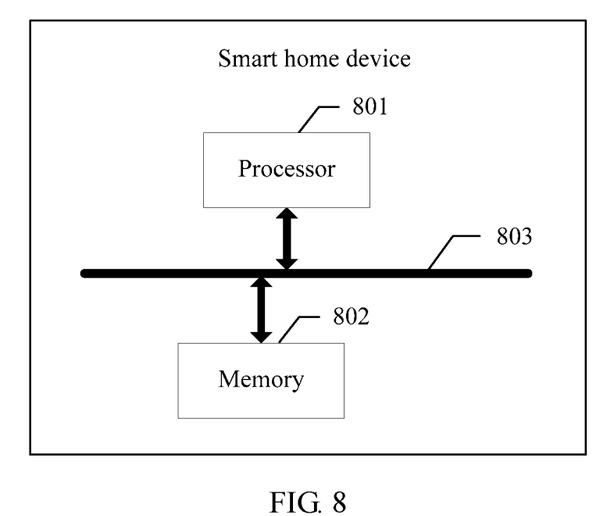
FIG. 8 is a structural diagram of hardware of a smart home device according to an embodiment of this application.

An embodiment of the present invention further provides a smart home device. The smart home device includes: a memory 802, configured to store a program instruction; and a processor 801, configured to invoke the program instruction stored in the memory 802 to: receive a function control instruction triggered by a user, where the function control instruction is entered by the user based on at least one operation indication displayed on an intelligent terminal device, and the operation indication is used to instruct the user to perform function control on the smart home device; and generate a first key based on the function control instruction, where the first key is used to decrypt encrypted information sent by the intelligent terminal device to the smart home device. A specific connection medium between the processor 801 and the memory 802 is not limited in this embodiment of this application. In this embodiment of this application, the memory 802 and the processor 801 are connected by using a bus 803 in FIG. 8. The bus is indicated by using a bold line in FIG. 8. A manner of connection between other components is merely an example for description, and imposes no limitation. The bus may be classified into an address bus, a data bus, a control bus, and the like. For ease of indication, the bus is indicated by using only one bold line in FIG. 8. However, it does not indicate that there is only one bus or only one type of bus.

An embodiment of the present invention further provides a computer readable storage medium, configured to store a computer software instruction used to execute operations that need to be executed by the processor. The computer software instruction includes a program used to execute the operations that need to be executed by the processor.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this application without departing from the spirit and scope of the embodiments of this application. This application is intended to cover these modifications and variations provided that they fall within the protection scope defined by the following claims and their equivalent technologies.

What is claimed is:

1. A method for securely controlling a smart home device, wherein the method comprises:

receiving, by an intelligent terminal device and from a user, an operation instruction, wherein the operation instruction instructs the intelligent terminal device to add the smart home device;

in response to receiving the operation instruction, displaying, by the intelligent terminal device, at least one operation indication for the smart home device, wherein the at least one operation indication instructs the user to perform function control on the smart home device;

receiving, by the intelligent terminal device and from the user, a selected operation indication, wherein the at least one operation indication comprises the selected operation indication;

in response to receiving the selected operation indication, generating, by the intelligent terminal device, a first key based on the selected operation indication; and encrypting, by the intelligent terminal device and as encrypted authentication information, authentication information of a Wi-Fi network using the first key, wherein the authentication information of the Wi-Fi network comprises at least one of a name, a password, or a certificate of the Wi-Fi network.

2. The method according to claim 1, wherein, after generating, by the intelligent terminal device, the first key based on the selected operation indication, the method further comprises:

generating, by the intelligent terminal device, a second key based on the first key; and encrypting, by the intelligent terminal device and using the second key, information to be sent to the smart home device.

3. The method according to claim 1, wherein, after encrypting the authentication information of the Wi-Fi network, the method further comprises:

sending the encrypted authentication information of the Wi-Fi network to the smart home device.

4. The method according to claim 1, wherein the operation indication is determined based on a type of the smart home device.

5. A method for securely controlling a smart home device, wherein the method comprises:

receiving, by the smart home device, a function control instruction triggered by a user, wherein the function control instruction is entered by the user based on at least one operation indication displayed on an intelligent terminal device, and wherein the at least one operation indication instructs the user to perform function control on the smart home device;

generating, by the smart home device, a first key based on the function control instruction;

receiving, by the smart home device and from the intelligent terminal device, encrypted authentication information of a Wi-Fi network; and obtaining, by the smart home device, decrypted authentication information of the Wi-Fi network, by decrypting, by the smart home device and using the first key, the encrypted authentication information of the Wi-Fi network, wherein the decrypted authentication information comprises at least one of a name, a password, or a certificate of the Wi-Fi network.

6. The method according to claim 5, wherein, after generating, by the smart home device, the first key based on the function control instruction, the method further comprises:

generating, by the intelligent terminal device, a second key based on the first key, wherein the second key is used to decrypt encrypted information sent by the intelligent terminal device to the smart home device.

7. The method according to claim 5, wherein, after generating, by the smart home device, the first key based on the function control instruction, the method further comprises:

accessing, by the smart home device, the Wi-Fi network by using the decrypted authentication information of the Wi-Fi network.

8. An intelligent terminal device, wherein the intelligent terminal device comprises:

a memory, the memory configured to store a program instruction; and at least one processor, the at least one processor configured to invoke the program instruction stored in the memory to:

receive, from a user, an operation instruction, wherein the operation instruction instructs the intelligent terminal device to add a smart home device;

in response to receiving the operation instruction, control a display to display at least one operation indication for the smart home device, wherein the at least one operation indication instructs the user to perform function control on the smart home device;

receive, from the user, a selected operation indication, wherein the at least one operation indication comprises the selected operation indication;

in response to receiving the selected operation indication, generate a first key based on the selected operation indication; and encrypt, as encrypted authentication information, authentication information of a Wi-Fi network using the first key, wherein the authentication information of the Wi-Fi network comprises at least one of a name, a password, or a certificate of the Wi-Fi network.

9. The intelligent terminal device according to claim 8, wherein the at least one processor is further configured to:

generate a second key based on the first key; and encrypt, using the second key, information to be sent to the smart home device.

10. The intelligent terminal device according to claim 8, wherein the at least one processor is further configured to:

send the encrypted authentication information of the Wi-Fi network to the smart home device.

11. A smart home device, wherein the smart home device comprises:

a memory, the memory configured to store a program instruction; and at least one processor, the at least one processor configured to invoke the program instruction stored in the memory to:

receive a function control instruction triggered by a user, wherein the function control instruction is entered by the user based on at least one operation indication displayed on an intelligent terminal device, and wherein the at least one operation indication instructs the user to perform function control on the smart home device;

generate a first key based on the function control instruction;

receive, from the intelligent terminal device, encrypted authentication information of a Wi-Fi network; and obtain decrypted authentication information of the Wi-Fi network, by decrypting, using the first key, the encrypted authentication information of the Wi-Fi network, wherein the decrypted authentication information comprises at least one of a name, a password, or a certificate of the Wi-Fi network.

12. The smart home device according to claim 11, wherein the at least one processor is further configured to:

generate a second key based on the first key, wherein the second key is used to decrypt encrypted information sent by the intelligent terminal device to the smart home device.

13. The smart home device according to claim 11, wherein the at least one processor is further configured to:

access the Wi-Fi network by using the decrypted authentication information of the Wi-Fi network.

\* \* \* \* \*